US007197517B2

(12) United States Patent
Farrington et al.

(10) Patent No.: US 7,197,517 B2
(45) Date of Patent: Mar. 27, 2007

(54) SYSTEMS, METHODS, AND COMPUTER PROGRAM PRODUCTS TO DISPLAY AND SELECT HIERARCHICAL DATABASE SEGMENTS AND FIELDS

(75) Inventors: Shannon M. Farrington, Gilroy, CA (US); Jacques J. Labrie, Sunnyvale, CA (US); Pei-chen Liu, San Jose, CA (US); Kevin M. McBride, Mountain View, CA (US); Mi W. Shum, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 10/255,529

(22) Filed: Sep. 25, 2002

(65) Prior Publication Data

US 2004/0059755 A1   Mar. 25, 2004

(51) Int. Cl.
  *G06F 12/00* (2006.01)
(52) U.S. Cl. .................. 707/201; 707/200; 707/104.1; 707/101
(58) Field of Classification Search ..... 707/100–104.1, 707/200–201
  See application file for complete search history.

(56) References Cited

U.S. PATENT DOCUMENTS

| 4,873,625 | A | * | 10/1989 | Archer et al. | ............... 707/7 |
| 5,303,367 | A | * | 4/1994 | Leenstra et al. | ........... 707/102 |
| 5,388,196 | A | | 2/1995 | Pajak et al. | .................. 395/153 |
| 5,644,736 | A | * | 7/1997 | Healy et al. | ................ 715/784 |
| 6,128,619 | A | * | 10/2000 | Fogarasi et al. | ............ 707/102 |
| 6,141,660 | A | | 10/2000 | Bach et al. | .................. 707/103 |
| 6,341,288 | B1 | * | 1/2002 | Yach et al. | ............. 707/103 R |
| 6,642,946 | B1 | * | 11/2003 | Janes et al. | .................. 715/854 |
| 6,879,986 | B1 | * | 4/2005 | Fisher | ........................ 707/101 |
| 2001/0034733 | A1 | | 10/2001 | Prompt et al. | ................ 707/102 |
| 2002/0010700 | A1 | | 1/2002 | Wortring et al. | ............. 707/100 |
| 2003/0135478 | A1 | * | 7/2003 | Marshall et al. | ................ 707/1 |
| 2003/0233373 | A1 | * | 12/2003 | Hembry | .................. 707/103 R |
| 2004/0001095 | A1 | * | 1/2004 | Marques | ..................... 345/771 |
| 2004/0001106 | A1 | * | 1/2004 | Deutscher et al. | .......... 345/838 |
| 2004/0054686 | A1 | * | 3/2004 | Hembry | .................. 707/103 R |
| 2005/0240638 | A1 | * | 10/2005 | Fisher | ........................ 707/205 |

OTHER PUBLICATIONS

IMS Java User's Guide, IBM, Corp., $2^{nd}$ Edition, SC27-0832-01, Jun. 2001.*

(Continued)

*Primary Examiner*—Jean Corrielus
*Assistant Examiner*—Anh Ly
(74) *Attorney, Agent, or Firm*—Christine H. Smith; Janet M. Skafar

(57) ABSTRACT

Systems, methods, and computer products that efficiently share and move data between different types of data storage formats. More particularly, the preferred embodiment of the present invention provides an easy to use graphical user interface (GUI) for displaying, navigating, and selecting hierarchical database segments and fields. The preferred embodiment of the present invention novelly uses a hierarchical tree structure that clearly represents the structures of a database and their mutual exclusivity, for easy understanding of and navigation through the various database structures. The user is prevented from selecting segments and fields that are not valid for the selected path thereby ensuring accuracy in the representation of the database data structures. Also, the user may select a path from the top of the hierarchical tree, the root, to a specific segment or field.

28 Claims, 9 Drawing Sheets

OTHER PUBLICATIONS

IBM—"IMS Java User's Guide, IMS Version 7"—SC27-0832-01—Second Edition (Jun. 2001) (pp.: 1-80).*

Atkinson et al. "Types and Persistence in Database Programming Languages"—1998 ACM pp.: 105-190.*

M. Mehdi Owrang O. "A Universal Hierarchical Language Interface for IMS"—1998 ACM pp.: 644-651.*

RD 450146, *User Interface Control To Customize The Expansion Of A Tree View, Research Disclosure,* Oct. 2001, pp. 1786-1787.

RD 448109, *Tree Navigator—a Concept for Navigation in Big Trees,* Research Disclousre, Aug. 2001, pp. 1384-1385.

IBM *IMS Data Propagotor for z/OS, An Introduction,*Version 3 Release 1, IBM order # GC27-1211-00, pp. 1-50.

IBM *Data Refresher Version 1 OS/2 User's Guide ,* 2.6.1.1 Automatically creating DataRefresher Sources and Views, 6 pages. Docnum SH19-6997-00, Copyright IBM Corporation 1994.

IBM *IMS Data Propagator for z/OS* Reference Version 3 Release 1, IBM order # SC27-1210-00. Chapter 3 pp. 26-75.

* cited by examiner

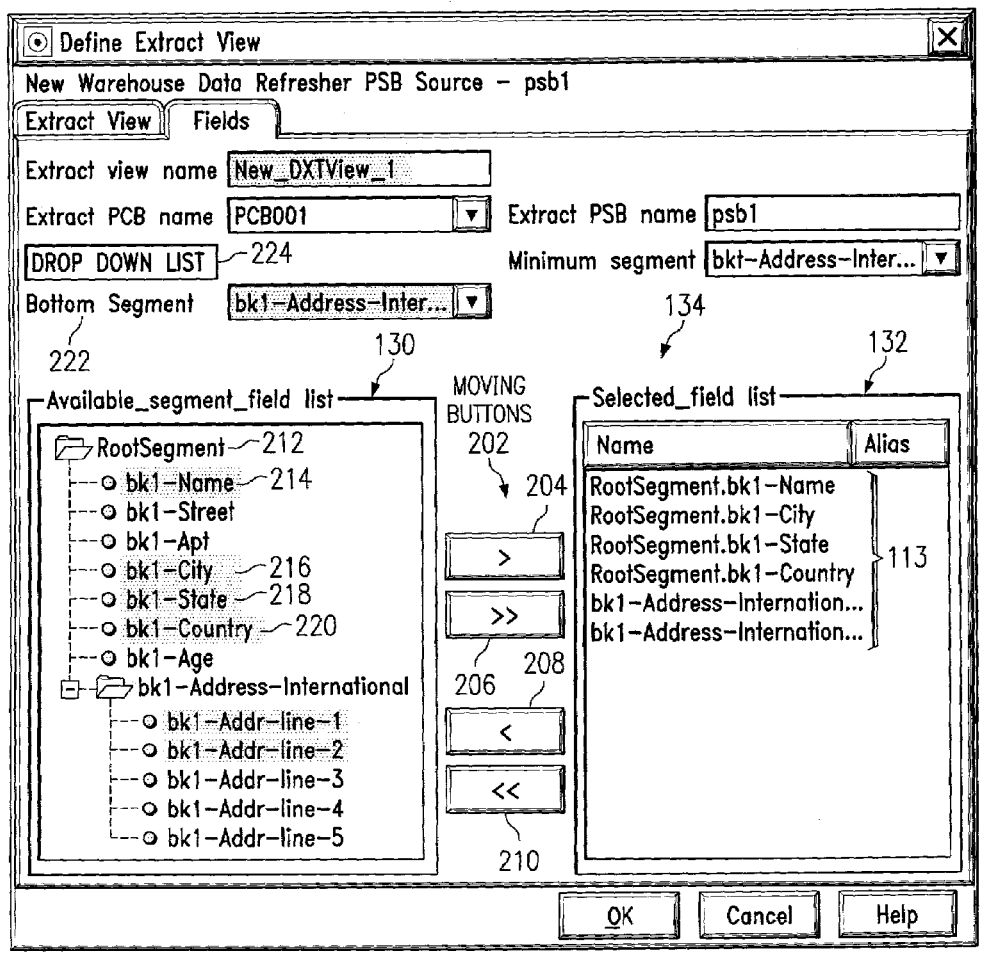

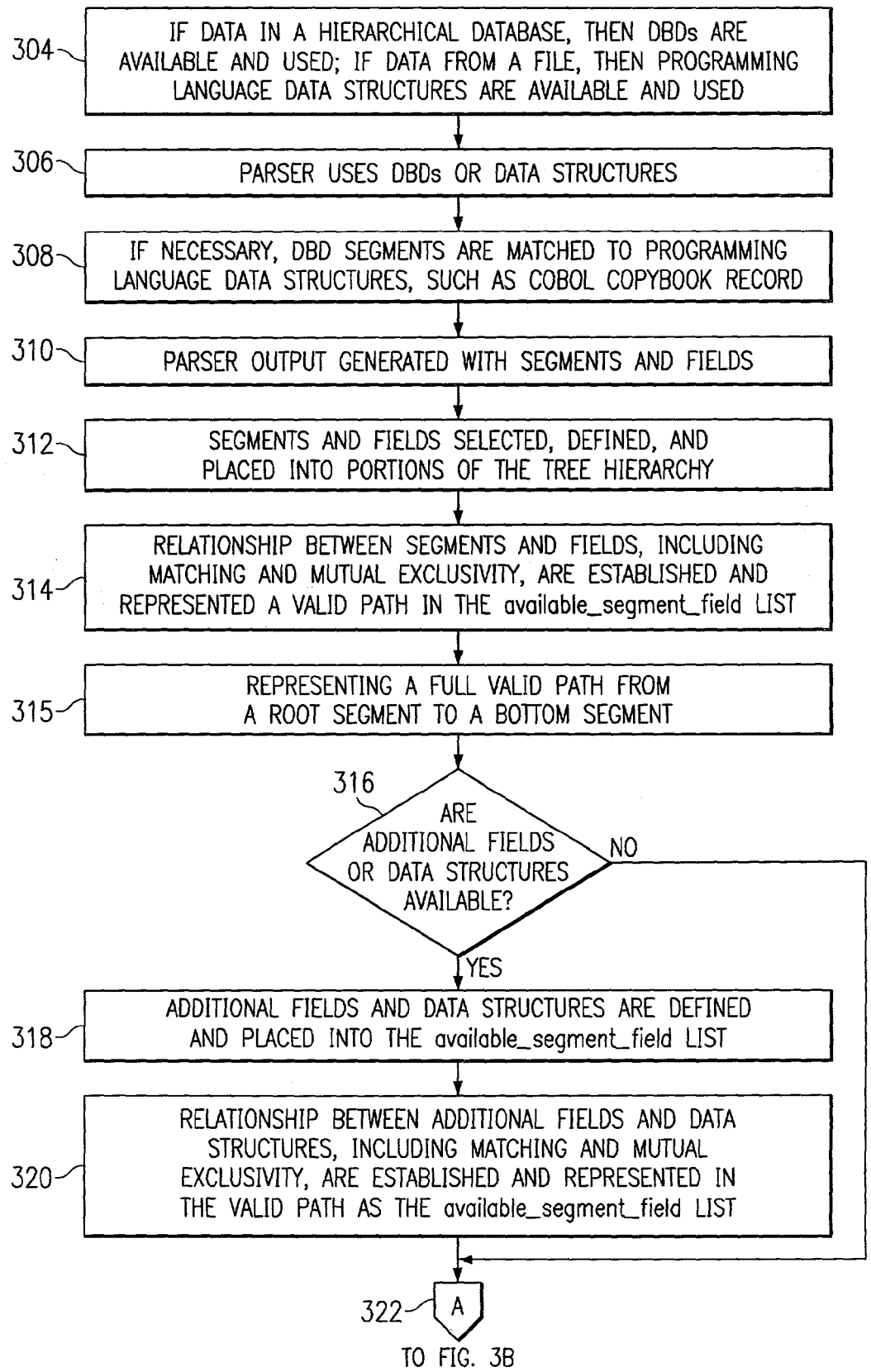

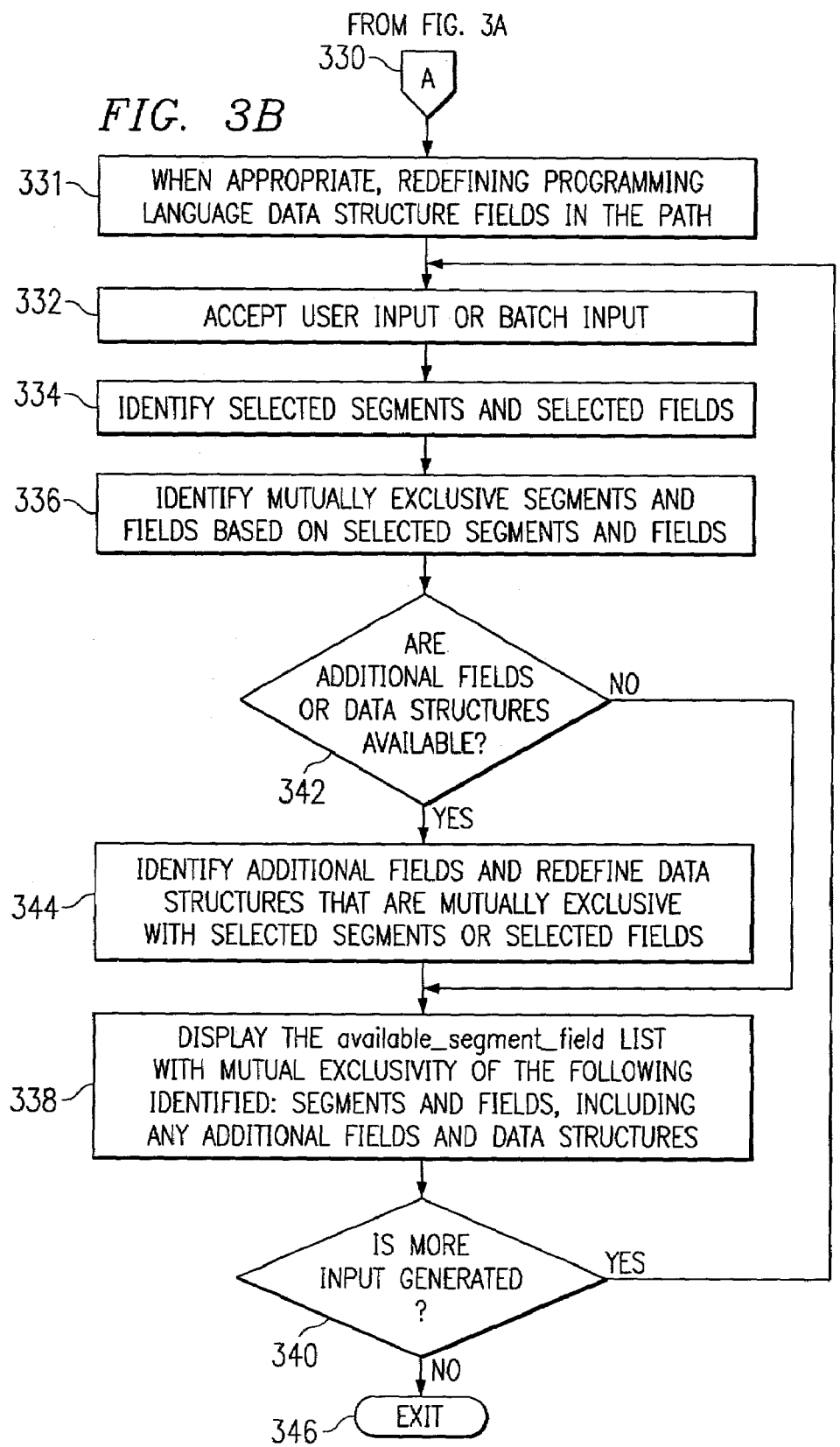

SYSTEMS, METHODS, AND COMPUTER PROGRAM PRODUCTS TO DISPLAY AND SELECT HIERARCHICAL DATABASE SEGMENTS AND FIELDS

BACKGROUND OF THE INVENTION

1. Field of the Invention

The present invention is directed to the field of computer-based formats for data management and data storage. More particularly the present invention is directed to sharing and moving data between different types of data storage formats.

2. Description of the Background Art

Many businesses store data in a number of formats, such as hierarchical structures and relational databases. For example, data may be stored in a database, such as the product marketed under the trademarks IBM IMS Database Manager (IMS). Data may also be stored in data files and accessed by systems such as the product marketed under the trademark Multiple Virtual Storage (MVS). Data files may be configured by the Virtual Storage Access Method (VSAM). Yet another technique for accessing and storing data is the use of a partitioned data set (PDS) that is typically used for direct-access storage that is divided into partitions. Relational data may be stored in databases, such as the product marketed under the trademark IBM DB2. Businesses often need to share and move data between the different types of data storage.

A database is a collection of data. The data in a database may be organized in a hierarchical structure. Such a structure may include segments and fields that contain units of data that may be transferred or manipulated by database techniques. Information about the hierarchical position of data within the hierarchical database may be stored with, and accessed by control mechanisms of a hierarchical database. For example, in an IMS Database Manager, data structures may be defined in a variety of ways, such as a database description (DBD) that is a collection of parameter statements. The database description typically defines characteristics, such as a database record structure, and relationships between segments in a database record. Another hierarchical structure is the program specification block (PSB) that is a control block that describes databases and logical message destinations used by an application program. The database description (DBD) may be contained within the program specification control block (PSB). Yet another hierarchical structure is a programming language data structure, such as a COBOL copybook structure or a PL/I data structure. Those skilled in the art will appreciate the use of programming language data structures. The programming language data structure may be used in the same manner as PSBs or other files that are included in a computer program and that provide information that enables compilation and execution of the computer program.

A relational database may be organized in the form of tables. A table typically consists of columns that represent attribute types and records that represent specific instances of data associated with the table, and the table has attribute instances associated with the columns. A relational database is a database that may be represented by a set of tables containing information that is manipulated in accordance with the relational model associated with the data. The product IBM DB2 stores the data associated with the database in tables, and each table has a name.

Mapping data structures from hierarchical structures, such as database records or data files, to relational tables can be a very time-consuming task. The use of various hierarchical data structures makes it difficult to visualize, navigate, and select the parts of hierarchical structure for techniques such as moving and copying data to a relational database. For instance when there is a large amount of data, navigating a path through the hierarchical structure associated with the data without understanding the mutual exclusivity of various data fields is prone to error and therefore an inefficient activity.

A further difficulty is that copying or moving data from a hierarchical database or data files requires information about segments and fields associated with each segment of information that is copied or moved. This adds overhead and requires valuable human resources and computer resources to facilitate such techniques. By means of example, users of relational database information often do not understand the structure and nature of hierarchical database information, and vise versa, thus making the process of copying or moving such data even more difficult.

From the foregoing it will be apparent that there is still a need to improve the technique of sharing and moving data between different types of data storage formats.

SUMMARY OF THE INVENTION

An embodiment of the present invention relates to systems, methods, and computer products that efficiently share and move data between different types of data storage formats. More particularly, the preferred embodiment of the present invention provides an easy to use graphical user interface (GUI) for displaying, navigating, and selecting segments and fields of a hierarchical database or data files and for identifying mutual exclusivity between the segments and fields. One embodiment of the present invention parses the PSBs, DBDs, and programming language data structures and displays the overlapping data structures represented in a hierarchical tree view of available segments and fields. The hierarchical tree view may be expanded or collapsed. The preferred embodiment of the present invention enables users to select segments and fields that are associated with a valid path in the hierarchical tree view and to view invalid paths. Alternatively the preferred embodiment of the present invention may automatically select fields that are associated with the valid path in the hierarchical tree view and indicate invalid paths. A database segment typically represents the smallest amount of data that may be transferred by a database operation. A field is a portion of a segment that is typically the smallest unit of data that may be referred to by hierarchical database operations.

The preferred embodiment of the present invention novelly uses a tree structure that clearly represents the structures of a database or a file, for easy understanding of and navigation through the various data structures. Further, the preferred embodiment of the present invention efficiently maps information typically associated with a relational database into a hierarchical tree structure. It is quite difficult to select the appropriate fields in a hierarchical tree structure that are associated with the most efficient path through the many levels of the hierarchical tree structure thereby enabling path efficient navigation of the hierarchical tree structure. According to the preferred embodiment of the present invention, the efficient path is represented by a list of fields that may include information about the field such as: the field name, the data type, the location of the field, and the length of the field. The preferred embodiment of the present invention enables quick and efficient navigation of such a path in a tree hierarchy that typically includes thousands of fields in hundreds of segments that are many layers deep.

The appropriate fields are therefore identified and mapped to information in a relational database that is typically located in columns of a table associated with the relational database.

In the preferred embodiment of the present invention selected segments within a list of segments will be represented with both their relationship and alignment to other segments, and their mutual exclusivity relative to other segments and fields clearly identified. This enables efficient and accurate navigation of a valid path through the hierarchical structure associated with large amounts of data.

Also, the user may select a full path from the top of the hierarchical tree, the root, to a specific segment or field. The user is prevented from selecting segments and fields that are mutually exclusive and therefore not valid for the selected path thereby ensuring accuracy in the representation of the data structures. In the preferred embodiment of the present invention, when the user selects the last, or bottom, segment in a hierarchical representation of segments the full path is concisely selected for the user thereby quickly enabling the user to access the full path without having to navigate the path.

Further, the definitions of the fields in various data structures are represented thereby enabling a user to select the segments and fields to be used during database and file system operations, from a variety of data structures. For example and in one embodiment of the present invention, programming language data structures located in data files are represented along with segments and fields thereby enabling the user to select data elements from either the programming language data structures, or segments and fields. In the preferred embodiment of the present invention the programming language data structures, such as COBOL copybook structures, may include redefinitions of the structures, and these redefined structures are presented to the user to ensure that all possible data is available and properly encoded. Further, this allows the user to choose a more meaningful data structure name, such as a COBOL copybook name, than the name defined in the database.

In one embodiment of the present invention computer-represented radio buttons associated with segments enable efficient movement of associated fields, such as insertion and removal of the fields, with respect to a selected or de-selected list of data segments. In one embodiment of the present invention, computer-represented boxes may be checked thereby identifying selected fields and computer-represented radio buttons may be highlighted thereby identifying selected segments. In the preferred embodiment of the present invention computer-based data operations retain information about the previous state of selections of radio buttons and boxes thereby enabling efficient exploration of alternative data structure representation.

An embodiment of the present invention is achieved by systems, methods, and computer products that efficiently share and move data between different types of data stored in different formats. One method of the present invention comprises: (a) using database descriptions and when available programming language data structures; (b) matching database descriptions to the programming language data structures, if available; (c) selecting, describing, and concisely placing segments and fields into a valid path within a hierarchical tree structure, such as an available_segment_field list; (d) establishing relationships, such as matches and mutual exclusivity, between the following elements: (i) segments, (ii) fields, and if available (iii) additional fields; (e) representing a full valid path from a root segment to a bottom segment; (f) presenting the valid path within the hierarchical tree structure; (g) accepting valid user input or valid batch input to incrementally select segments and fields; and (h) when appropriate, redefining programming language data structure fields that are included in the presented valid path.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 2A is a block diagram that illustrates a hierarchical tree structure used in one embodiment of the present invention;

FIG. 3A is a flow diagram that illustrates the present invention;

FIG. 3B is a flow diagram that illustrates receipt of user input of the present invention.

In the following detailed description and in the several figures of the drawings, like elements are identified with like reference numerals.

DETAILED DESCRIPTION OF THE INVENTION

Figure 1:
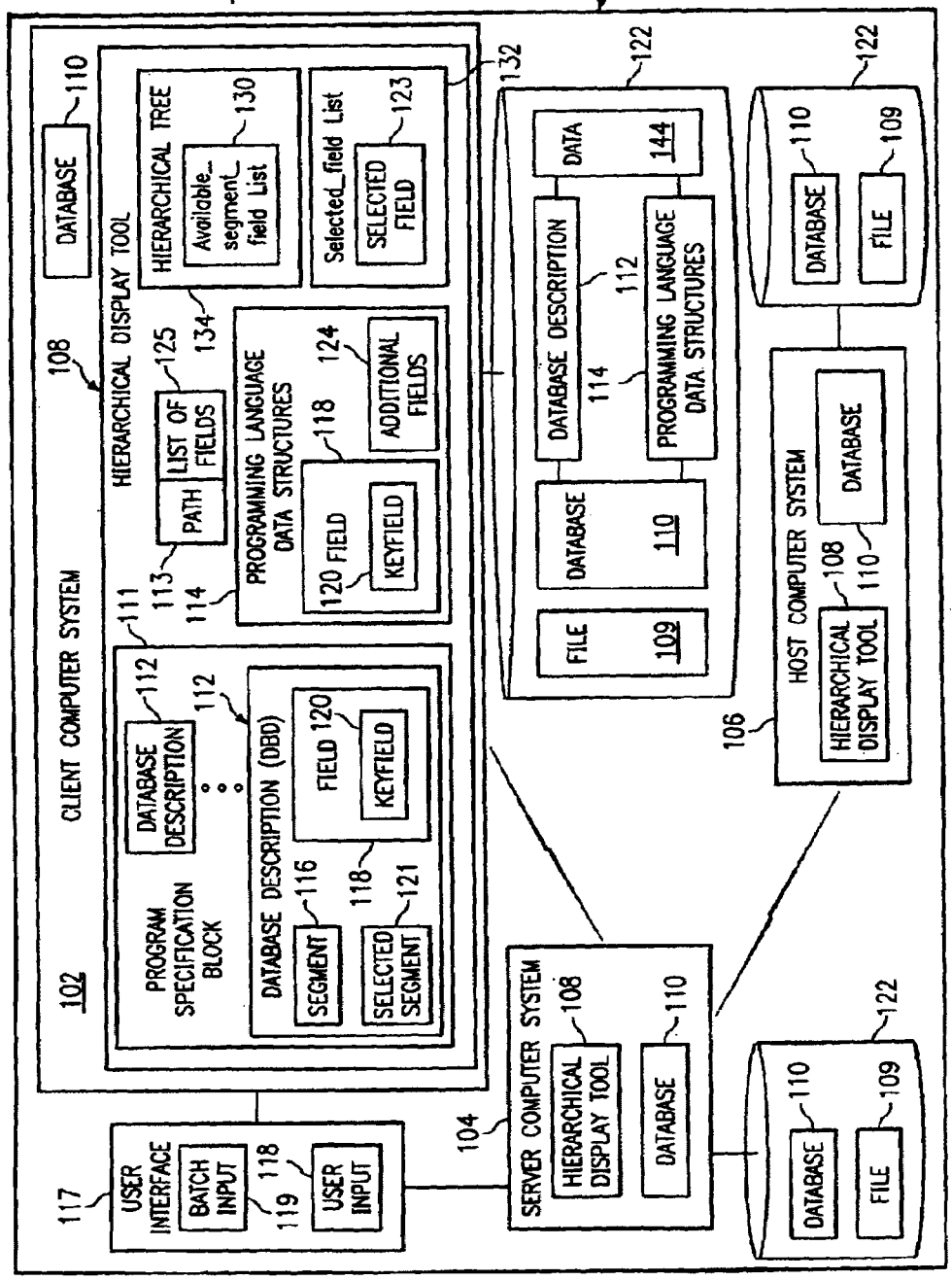
FIG. 1 is a block diagram that illustrates the computer systems that may implement the present invention.

As shown in the drawings and for purposes of illustration, the embodiment of the invention novelly enables users to efficiently share and move data between different types of data storage formats and to identify the mutual exclusivity of the data in a hierarchical structure. Existing systems have not been able to improve the technique of sharing and moving data between different types of data storage formats and have not been able to efficiently identify mutual exclusivity of the data.

FIG. 1 is a block diagram that illustrates the computer systems that may operate with the present invention. As shown in FIG. 1 and in element 100, the preferred embodiment of the present invention may operate in a networked computer system configuration. Therefore, a client computer system 102 may communicate with a server computer system 104 during the operation of the present invention. Further, the server computer system 104 may operate in conjunction with the host computer system 106. The hierarchical display tool 108 operates in the client 102, the server 104, or the host computer system 106 to perform the preferred embodiment of the present invention. For example, information may be communicated to either the server 104 or the client 102 via the user interface 117; and may subsequently be used by the hierarchical display tool 108 to enable users to efficiently share and move data between different types of data storage formats. The user interface 117 may communicate with the preferred embodiment of the present invention, either via batch input 119 or user input 118.

The hierarchical display tool 108 includes a database description (DBD) 112 that typically includes at least one segment 116 and at least one database description field 118. The field 118 may include a key field 120 that is a field 118 that may be used to search for the location of data 144 associated with one or more segments 116. The database description (DBD) 112 is typically included in the program specification block (PSB) 111. In the preferred embodiment of the present invention there may be multiple database descriptions (DBD) 112 in the program specification block (PSB) 111 that are searched for appropriate segments 116 and fields 118.

Further, the hierarchical display tool 108 may include an available_segment_field list 130 and a selected_field list 132. The available_segment_field list 130 is used to concisely describe and present the elements of the hierarchical tree structure 134 that represent relationships among the data 144. The available_segment_field list 130 may include both segments 116 and fields 118 and, when available, information from the programming language data structures 114. The selected_field list 132 represents those selected fields 123 that are associated with selections from the available-_segment_field list 130 including: segments 116, selected segments 121, fields 118, and if available additional fields 124. The terms "hierarchical tree" and "hierarchical tree structure" will be used interchangeably herein.

The hierarchical display tool 108 also may include at least one programming language data structure 114. The programming language data structure 114 provides an application view of data 144, while the database description 112 provides a database view of data 144. The programming language data structure 114 is typically stored in a computer system 400 as a representation of a book format. The information in the programming language data structure 114 is functionally equivalent to include files that may be found in the C or C++ programming languages. Those skilled in the art will appreciate the use of programming language include files. The programming language data structure 114 may be used by the hierarchical display tool 108 to match the data structures 114 to segments 116 and fields 118. The programming language data structure 114 may include additional fields 124 not available in the database description 112 and that may be provided to the user by the hierarchical display tool 108. The additional fields 124 may be matched to structures in the database description (DBD) 112, such as the segment 116 and the field 118. Element 400 is described with reference to FIG. 4.

Further, the hierarchical display tool 108 presents a path 113 that includes a list of fields 125 that enables path efficient navigation of the hierarchical tree structure 134. The list of fields 125 may include information about each field 118 such as: the field name, the data type, the location of the field, and the length of the field. The appropriate fields 118 in the list of fields 125 are therefore identified and mapped to information in a relational database 110 that is typically located in columns of a table associated with the relational database 110.

It will be appreciated that the embodiment of the present invention that matches a variety of data formats may be implemented using the programming language data structure 114 or similar structure definitions in other programming languages. Among other examples, the programming language data structure 114 may be associated with a database 110 or a data file 109. The description herein of the programming language data structure 114 is for purposes of illustration and should not be construed as limiting. In general, a programming language data structure 114 is used to format data 144 that is used in any computer-implemented programming language.

Further, the database 110 or a file 109 may be configured in the memory 458 of the client 102, the server 104, or the host 106. Alternatively the database 110 or a file 109 may be configured in computer storage such as that of a disk 122. Element 458 is described with reference to FIG. 4.

FIG. 2 includes FIG. 2A, FIG. 2B, FIG. 2C, FIG. 2D, FIG. 2E, FIG. 2F, FIG. 2G, FIG. 2H, FIG. 2I, and FIG. 2J.

FIG. 2A is a block diagram that illustrates a hierarchical tree structure 134 used in one embodiment of the present invention. The hierarchical tree structure 134 is represented by the available_segment_field list 130. Those skilled in the art will appreciate the use of a tree structure to describe a hierarchy relationship. The moving_buttons 202 enable the user to move selected fields 123 from the available_segment_field list 130 to the selected_field list 132. In the preferred embodiment of the present invention choosing the ">" element 204 of the moving_buttons 202 moves the selected field 123 to the selected_field list 132. The selected_field list 132 represents columns in a relational database 110. Choosing the ">>" element 206 of the moving_buttons 202 moves all the fields 118 in the available_segment_field list 130 to the selected_field list 132. Further and in the preferred embodiment of the present invention choosing the "<" element 208 of the moving_buttons 202 moves the selected field 123 from the selected_field list 132. Choosing the "<<" element 210 of the moving_buttons 202 moves all the fields 118 from the selected_field list 132. Elements 110, 118, and 123 are described with reference to FIG. 1.

In one embodiment of the present invention, multiple segments 116 under the root segment 212 may be represented in the path 113 shown in the available_segment_field list 130 or the selected field list 132. When multiple child segments 116 are represented, the user can only select fields 118 from one child segment 116 at a time. By means of example, the following segments 121 have been selected and are child segments 116 of the root segment 212: bkl-Name 214, bkl-City 216, bkl-State 218, and bkl-Country 220. As described in further detail with respect to FIG. 2D and FIG. 2E, when the user selects a field 118 under one child segment 116, the fields under the other child segments 116 at the same level are mutually exclusive and therefore disabled. Elements 116, and 121 are described with reference to FIG. 1.

The bottom segment 222 enables efficient identification of the full path 113 from the root segment 212 to the selected bottom segment 222. The full path 113 represents the hierarchical relationship from the top-most segment 116, the root segment 212, to the selected bottom segment 222. A valid path 113 in a hierarchical tree structure 134 includes the key fields 120 from the root segment 212 to the bottom segment 222 and the segments 116 in direct descent from root segment 212 to the bottom segment 222. The valid path 113 for a hierarchical database 110 may optionally contain data fields 118 from the bottom segment 222 and its direct parent. The valid path 113 for the structure of hierarchical files 109 may optionally contain data fields 118 from any segment 116 in direct descent from the root segment 212 to the bottom segment 222. The valid path 113 typically does not contain any fields 118 from segments 116 that are not in direct descent from the root segment 212 to the bottom segment. Elements 109 and 120 are described with reference to FIG. 1.

When the bottom segment 222 is selected from the bottom segment drop-down list 224 the tree in the available field list 130 will be expanded from the root segment 212 to the bottom segment 222 with all the valid fields 118 being selectable. The other invalid tree paths 113 are collapsed and may be expanded but not selected.

Figure 2B:
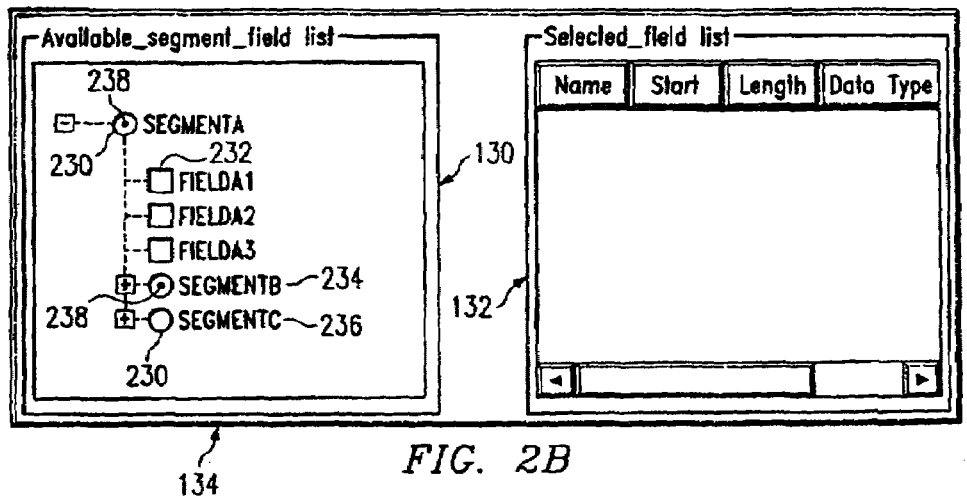
FIG. 2B is a block diagram that illustrates an alternative embodiment of the hierarchical tree structures used in the present invention.

FIG. 2B is a block diagram that illustrates an alternative embodiment of the hierarchical tree structure 134 used in the present invention. More particularly, an alternative embodiment of the available_segment_field list 130 and the selected_field list 132 is illustrated. Here, the segments 116 are associated with radio buttons 230 that are highlighted if selected and the fields 118 are associated with boxes 232 that are checked if selected. The radio buttons 230 associated with segments 116 at the same level are mutually exclusive. This enables the user to select multiple fields 118 in the available_segment_field list 130 while preventing the selection of invalid segments 116 or fields 118 from invalid paths 113. Therefore the valid path 113 that is represented to the user may include a representation of mutual exclusivity of either segments 116 or fields 118. For example, SEGMENTB 234 and SEGMENTC 236 cannot be both selected at the same time, therefore the radio button 230 associated with SEGMENTB 234 may be chosen, but at the same time the radio button 230 associated with SEGMENTC 236 may not be chosen. Here the chosen radio button 230 associated with SEGMENTB 234 is formatted with a dark dot in the center of the button 238 that indicates its selection by highlighting. It will be appreciated that the labels used herein to represent segments 116 and fields 118 are limited in length to facilitate the description and should not be construed as limiting to the present invention. Alternate lengths for labels and alternate label formats may be used without departing from the spirit of the invention. Elements 113, 116, 118 and 134 are described with reference to FIG. 1.

Figure 2C:
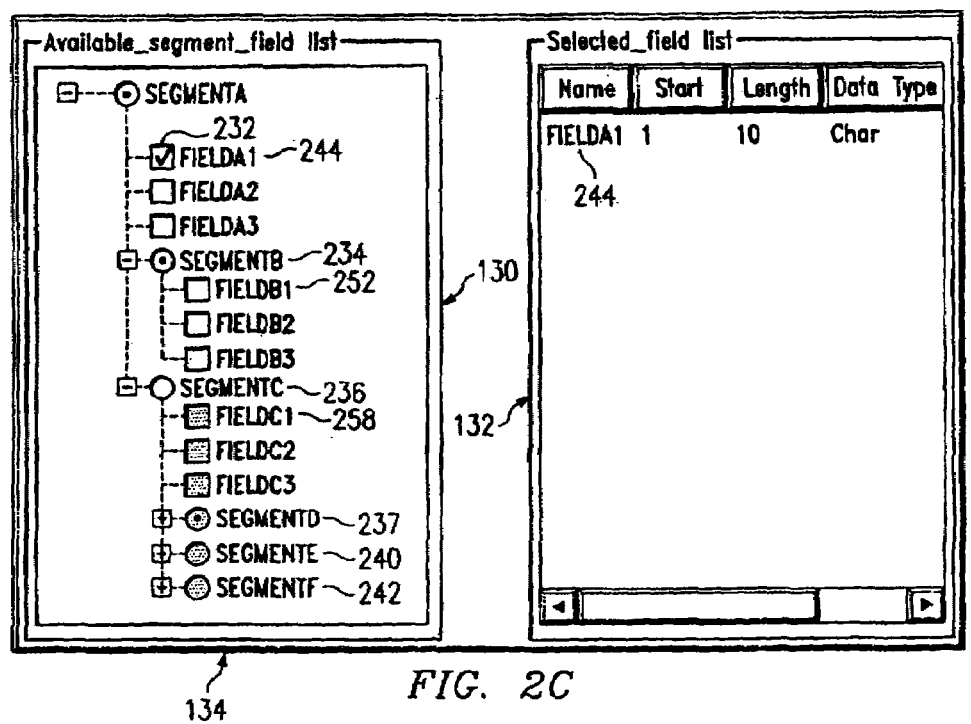
FIG. 2C is a block diagram that further illustrates an expanded view of the hierarchical tree structure as represented in FIG. 2B and mutual exclusivity of fields and segments.

FIG. 2C is a block diagram that further illustrates an expanded view of the hierarchical tree structure 134 and mutual exclusivity of fields 118 and segments 116. That is, in an embodiment of the present invention, segments 116 at the same or lower level are treated as a group. When one selected segment 121 within the group is chosen then the other segments 116 within the group may not be selected. This enables efficient identification of the full path 113 associated with a segment 116 by eliminating segments 116 that are at the same or lower level and are not included in the full path 113 associated with the segment 116. Therefore, since SEGMENTD 237, SEGMENTE 240, and SEGMENTF 242 are positioned at the same hierarchical level, they are mutually exclusive. Also, since SEGMENTB 234 and SEGMENTC 236 are positioned at the same hierarchical level, they are mutually exclusive. Therefore, since SEGMENTB 234 is selected, SEGMENTC 236 is disabled. Also the fields 118 under SEGMENTC 236 are disabled, as they are mutually exclusive with SEGMENTB 234 and its associated fields 118. For example FIELDB1, as shown in element 252, that is under SEGMENTB 234 is mutually exclusive with fields 118 under SEGMENTC 236 such as FIELDC1, as shown in element 258. Further, the segments 116 under SEGMENTC 236 are also disabled including: SEGMENTD 237, SEGMENTE 240, and SEGMENTF 242. Elements 113, 116, 118, and 121 are described with reference to FIG. 1.

When a box 232 in the available_segment_field list 130 associated with a field 118 is checked, the associated field 118 appears in selected_field list 130. If a box 232 associated with a field 116 is unchecked, it is removed from selected_field list 132. For example, the box 232 associated with FIELDA1 as shown in element 244 is checked and therefore FIELDA1 as shown in element 244 appears in selected_field list 132.

Figure 2D:
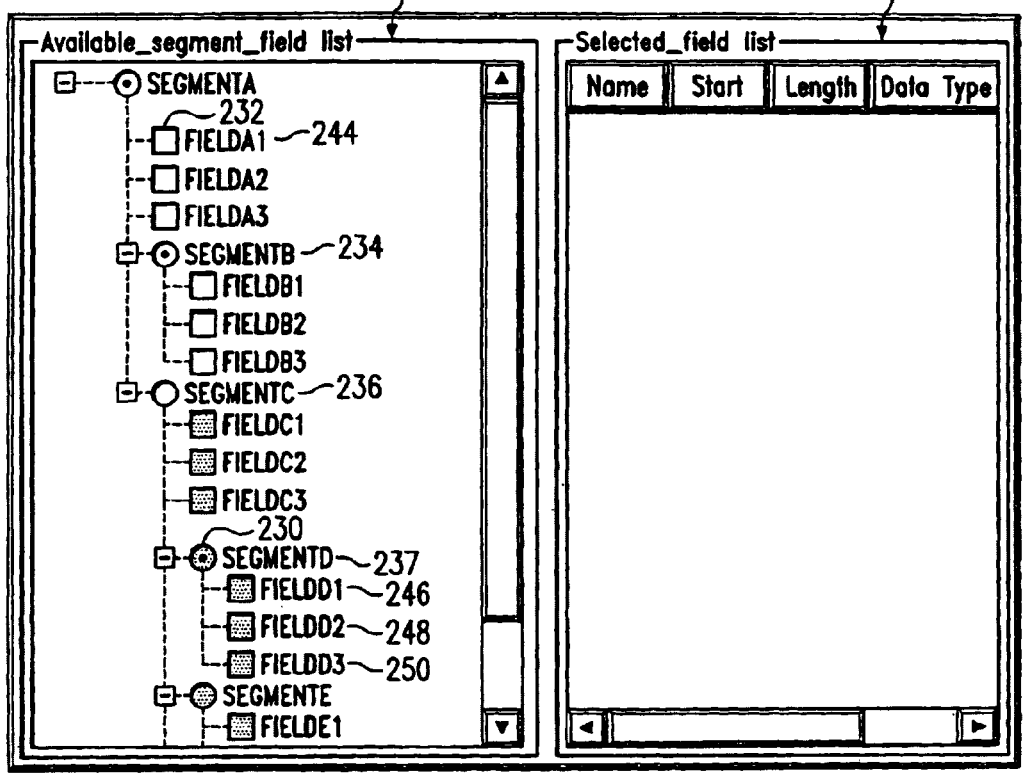
FIG. 2D is a block diagram that illustrates selection and de-selection of a segment.

FIG. 2D is a block diagram that illustrates selection and de-selection of a segment 116. As shown in FIG. 2D and in the available_segment_field list 130 the box 232 associated with FIELDA1 as shown in element 244 is now unchecked. Therefore FIELDA1 as shown in element 244 has been removed from selected_field list 132. Further, since SEGMENTB 234 has been chosen, the segments 116 at the same hierarchical level are unselected and the segments 116 at a lower hierarchical position than SEBMENTB 234 are disabled. Therefore SEGMENTC 236 is unselected in the present example. Also, SEGMENTD 237 is disabled in the present example. Further, since SEGMENTD 237 is currently disabled, even though the radio button 230 associated with SEGMENTD 237 is selected, SEGMENTD 237 is disabled. Also, the following fields 118 are disabled: FIELDD1 as shown in element 246, FIELDD2 as shown in element 248, and FIELDD3 as shown in element 250 cannot be selected until SEGMENTC 236 is selected. Elements 116, 118, and 132 are described with reference to FIG. 1.

Figure 2E:
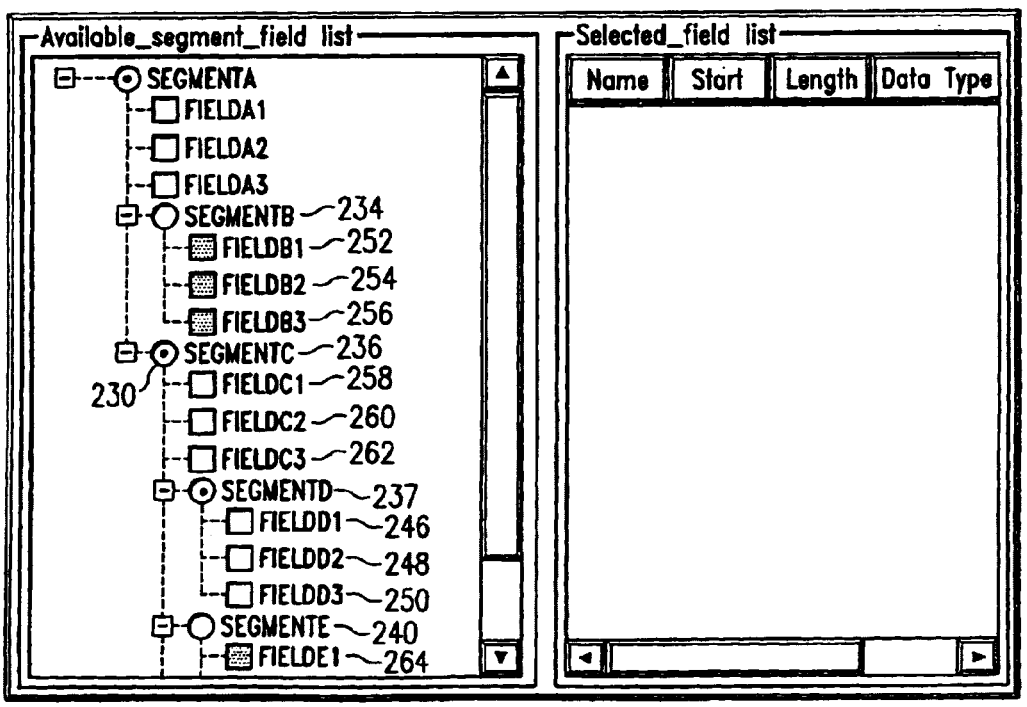
FIG. 2E is a block diagram that illustrates enabling and disabling fields as a result of changing the selected segment.

FIG. 2E is a block diagram that illustrates enabling and disabling fields 118 as a result of changing the selected segment 121. Therefore, when the radio button 230 associated with SEGMENTC 236 is selected, the segments 116 and fields 118 beneath it become enabled and those of SEGMENTB 234 become disabled. More particularly in the present example, since SEGMENTB 234 is now disabled the following fields 118 are also disabled: FIELDB1 as shown in element 252, FILEDB2 as shown in element 254, and FIELDB3 as shown in element 256. Further, since SEGMENTC 236 is now enabled the following fields 118 are enabled: FIELDC1 as shown in element 258, FIELDC2 as shown in element 260, and FIELDC3 as shown in element 262. Elements 116, 118, and 121 are described with reference to FIG. 1.

Also, since SEGMENTD 237 is the top child segment 116 with respect to selected SEGMENTC 236, and since SEGMENTC 236 is enabled SEGMENTD 237 and the fields 118 associated with SEGMENTD 237 are enabled. Therefore, the following fields 116 are enabled: FIELDD1 as shown in element 246, FIELDD2 as shown in element 248, and FIELDD3 as shown in element 250. By means of comparison, SEGMENTE 240 is not the top child segment 116 with respect to selected SEGEMENTC 236. Therefore, SEGMENTE 240 and the fields 118 associated with SEGMENTE 240, such as FIELDE1 264, are not enabled.

Figure 2F:
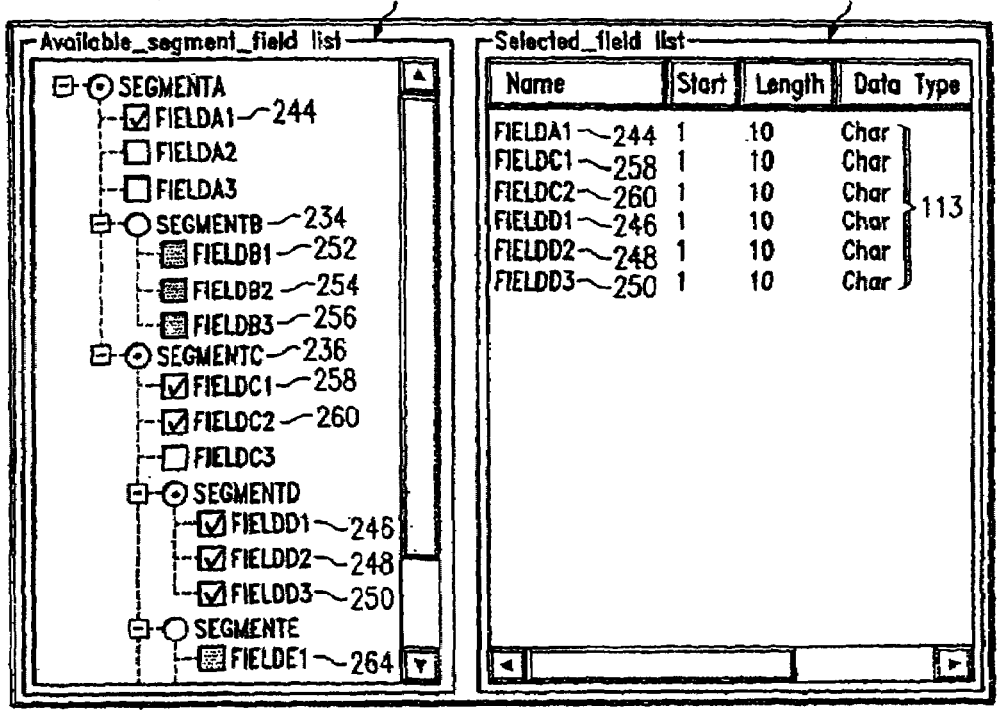
FIG. 2F is a block diagram that illustrates selecting segments and fields at various levels.

FIG. 2F is a block diagram that illustrates selecting segments 116 and fields 118 at various levels of the selected path 113. Therefore and in the present example, the user has selected the following fields 116: FIELDA1 as shown in element 244, FIELDC1 as shown in element 258, FIELDC2 as shown in element 260, FIELDD1 as shown in element 246, FIELDD2 as shown in element 248, and FIELDD3 as shown in element 250. In the preferred embodiment of the present invention and in the present example, the following selected fields 123 appear in the selected_field list 132: FIELDA1 as shown in element 244, FIELDC1 as shown in element 258, FIELDC2 as shown in element 260, FIELDD1 as shown in element 246, FIELDD2 as shown in element 248, and FIELDD3 as shown in element 250. By means of contrast since SEGMENTB 234 was de-selected as a result of the selection of SEGMENTC 236, the following fields 116 in the available_segment_field list 130 are disabled: FIELDB1 as shown in element 252, FIELDB2 as shown in element 254, FIELDB3 as shown in element 256, and FIELDE1 as shown in element 264. Elements 116, 118, and 123 are described with reference to FIG. 1.

Figure 2G:
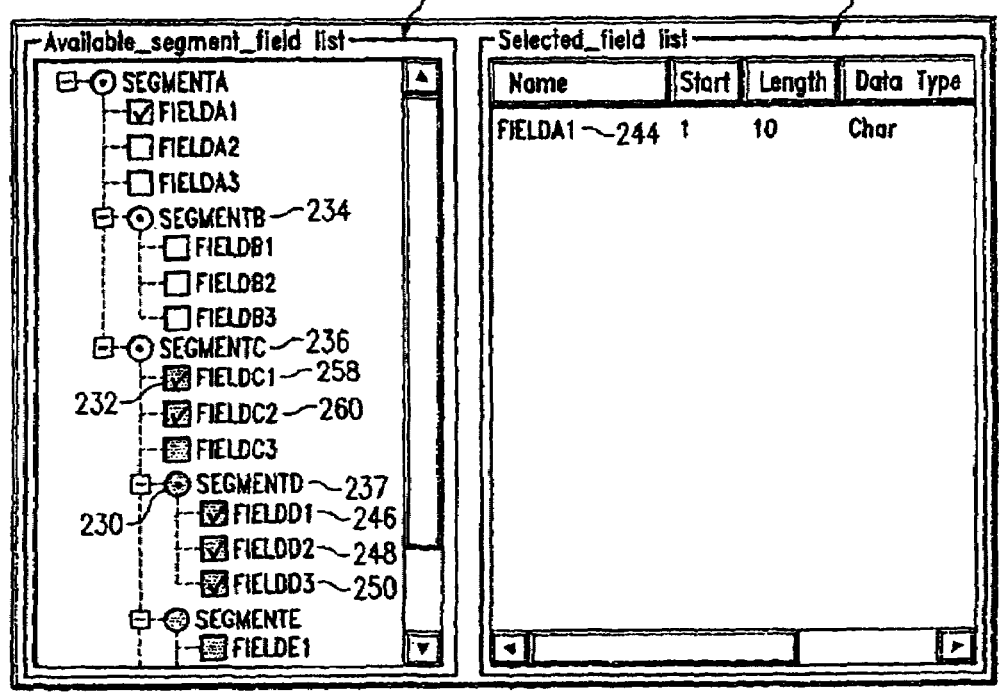
FIG. 2G is a block diagram that illustrates how changing selection of a segment de-selects fields and how information about previous selections is retained.

FIG. 2G is a block diagram that illustrates changing selection of a segment 116 that de-selects fields 118 and how information about previous selections is retained. It will be appreciated that FIG. 2F represents the state of the selection of the field 118 prior to the present example. In the present example, when a user changes the selected segment 121 from SEGMENTC 236 to SEGMENTB 234 the fields 118 that were previously selected are associated with checked boxes 232 that are now disabled. In the present example the following newly disabled fields 118 are associated with checked boxes 232 that are disabled: FIELDC1 as shown in element 258, FIELDC2 as shown in element 260, FIELDD1 as shown in element 246, FIELDD2 as shown in element 248, and FIELDD3 as shown in element 250. Also these fields 118 are removed from the selected_fields list 132. Therefore, the current selected_fields list 132 includes only FIELDA1 as shown in element 244, which was previously selected and is not currently disabled. Elements 116, 118, 121, and 132 are described with reference to FIG. 1.

Further, the preferred embodiment of the present invention novelly retains the state of the previously selected and checked boxes 232 and highlighted radio buttons 230, even after they have been disabled. For example, the following newly disabled fields 118 are identified as both disabled, by shading, and as previously selected, by checked boxes: FIELDC1 as shown in element 258, FIELDC2 as shown in element 260, FIELDD1 as shown in element 246, FIELDD2 as shown in element 248, and FIELDD3 as shown in element 250. Further, the following newly disabled SEGMENTD 237 is identified as both disabled, by shading, and as previously selected, by a highlighted radio button 230. The use of boxes 232 and radio buttons 230 herein should not be construed as limiting. Rather, they are shown for the purpose of illustrating the selection and de-selection of segments 116 and fields 118.

Figure 2H:
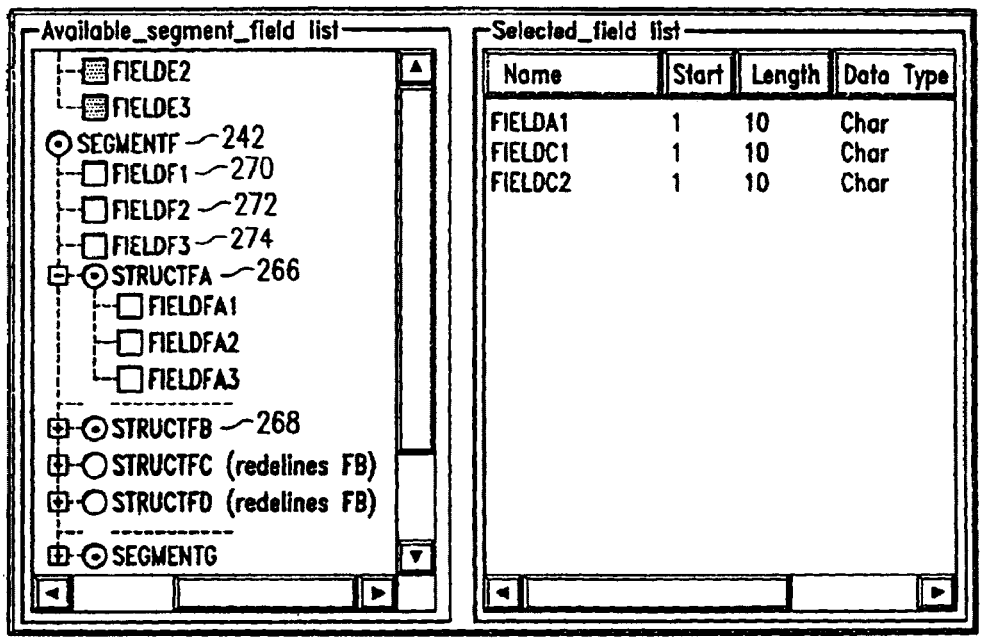
FIG. 2H is a block diagram that illustrates the definition of structures within a segment.

FIG. 2H is a block diagram that illustrates the definition of structures within a segment 116. In the present example, there are structures defined in the programming language data structure 114 for use by an application, such as an IBM IMS Database Manager or in a data file 109 that may be accessed by Multiple Virtual Storage (MVS). Further, the following programming language data structures 114 are not defined in the database description (DBD) 112 for the database 110: STRUCTFA 266 and STRUCTFB 268. In the present example, SEGMENTF 242 has been selected that includes FIELDF1 as shown in element 270, FIELDF2 as shown in element 272, and FIELDF3 as shown in element 274. SEGMENTF 242 also includes the following programming language data structures: STRUCTFA 266 and STRUCTFB 268. In this instance and due to the nature of these specific programming language data structures 114, these programming language data structures are not mutually exclusive. Therefore, STRUCTFA 266 and STRUCTFB 268 may both be selected. Elements 109, 110, 112, 114, and 116 are described with reference to FIG. 1.

Figure 2I:
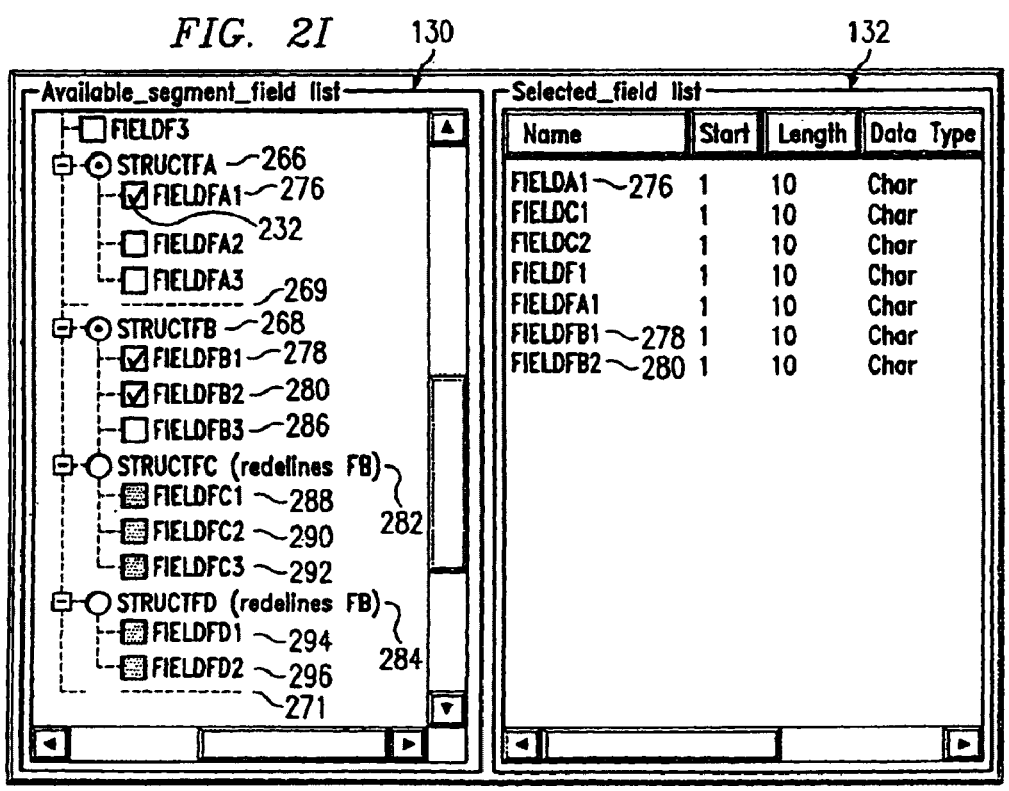
FIG. 2I is a block diagram that further illustrates the definition of structures within a segment.

FIG. 2I is a block diagram that further illustrates the definition of programming language data structures 114 and their association with at least one segment 116. In the present example, the fields 118 associated with both STRUCTFA 266 and STRUCTFB 268 can be selected at the same time. Therefore, the following fields 118 that are checked in associated boxes 232 in the available_segment_field list 130 also appear in the selected_field list 132: FIELDFA1 as shown in element 276, FIELDFB1 as shown in element 278, and FIELDFB2 as shown in element 280. Elements 114, 116, 118, and 132 are described with reference to FIG. 1.

Further in the present example, the following programming language data structures 114 redefine STRUCTFB 268: STRUCTFC 282 and STRUCTFD 284. That is, sometimes the computer storage space taken up by the programming language data structure 114 is in the format of the fields 118 associated with the programming data language structure 114, such as STRUCTFB 268 including: FIELDFB1 as shown in element 278, FIELDFB2 as shown in element 280, and FIELDFB3 as shown in element 286. At other times the computer storage space taken up by STRUCTFB 268 is in the redefining format of STRUCTFC 282 including the following fields 118: FIELDFC1 as shown in element 288, FIELDFC2 as shown in element 290, and FIELDFC3 as shown in element 292. At still other times the computer storage space taken up by STRUCTFB 268 is in the redefining format of STRUCTFD 284 including the following fields 118: FIELDFD1 as shown in element 294, and FIELDFD2 as shown in element 296. Therefore, the preferred embodiment of the present invention enables efficiency for the user while analyzing alternate programming language data structures 114 by identifying the redefining relationship between the programming language data structures 114. Element 114 is described with reference to FIG. 1.

In the preferred embodiment of the present invention dotted lines are used to identify the programming language data structures 114 that are treated as a group and therefore are mutually exclusive. Therefore in the present example, elements 269 and 271 identify a group that includes: STRUCTFB 268, STRUCTFC 282, and STRUCTFD 284. In the present example the fields 118 of STRUCTFB 268, STRUCTFC 282, and STRUCTFD 284 are mutually exclusive and are treated like mutually exclusive fields 118 in the available_segment_field list 130. For example FIELDFB1 as shown in element 278, FIELDFB2 as shown in element 280, and FIELDFB3 as shown in element 286 are mutually exclusive with: FIELDFC1 as shown in element 288, FIELDFC2 as shown in element 290, FIELDFC3 as shown in element 292, FIELDFD1 as shown in element 294, and FIELDFD2 as shown in element 296.

Figure 2J:
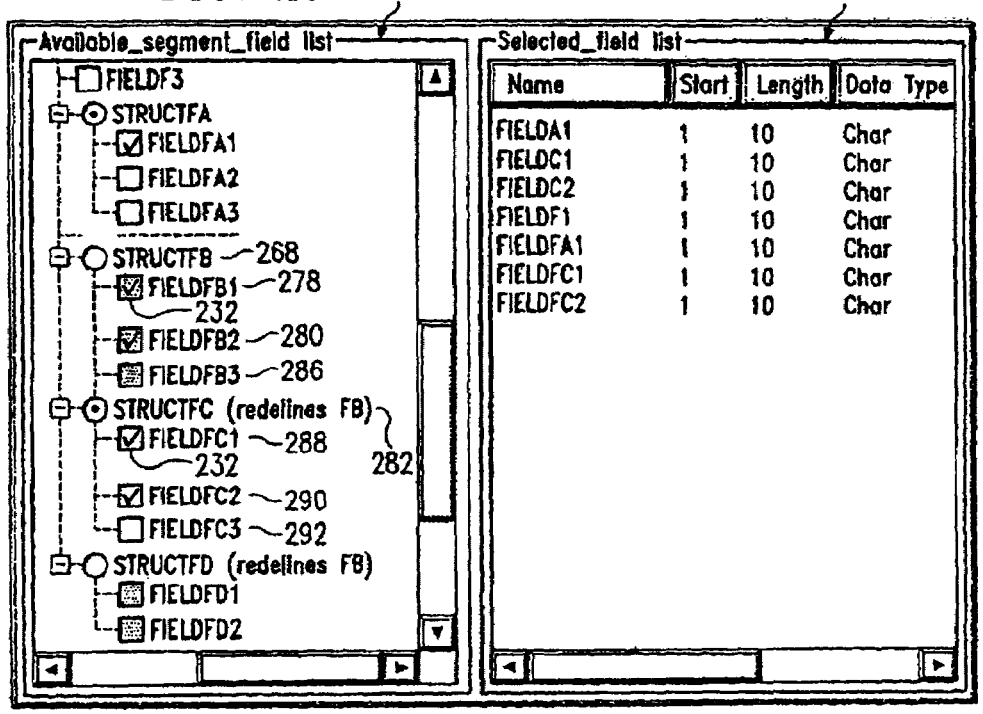
FIG. 2J is a block diagram that illustrates mutual exclusivity of redefined structures.

FIG. 2J is a block diagram that also illustrates mutual exclusivity of redefined programming language data structures 114. Therefore, in the present example STRUCTFC 282 is mutually exclusive with STRUCTFB 268. When STRUCTFC 282 is selected, the fields 118 of STRUCTFB 268 are disabled and removed from the selected_fields list 132 and boxes 232 associated with the fields 118 of STRUCTFC 282 may be checked. Therefore, the following fields 118 may be selected and the associated boxes 232 may be checked: FIELDFC1 as shown in element 288, FIELDFC2 as shown in element 290, and FIELDFC3 as shown in element 292. Elements 114, 118, and 132 are described with reference to FIG. 1.

More particularly, the following fields 118 of STRUCTFB 268 are deselected: FIELDFB1 as shown in element 278, FIELDFB2 as shown in element 280, and FIELDFB3 as shown in element 286. These deselected fields 118 are no longer listed in the selected_field list 132. Also, the boxes 232 associated with the deselected fields 118 in the available_segment_field list 130 are still checked but are now shaded to show that they currently disabled and may not be selected.

FIG. 3 includes FIG. 3A and FIG. 3B. FIG. 3A is a flow diagram that illustrates the present invention. As shown in element 304, if the data 144 is included in a database 110, then database descriptions 112 are available and used. If data 144 is included in a file 109, then programming language data structures 114 are available and used. As shown in element 306, a parser uses the database descriptions 112 or the programming language data structures 114 if available. Those skilled in the art will appreciate the use of a parser in data translation operations, such as the operations of the present invention. If necessary, the database descriptions 112 are matched to the programming language data structures 114, as shown in element 308. Then as shown in element 310, the parser output is generated and includes segments 116 and fields 118. As shown in element 312, segments 116 and fields 118 are selected, defined, and placed into portions of the hierarchical tree structure 134. More particularly and in the preferred embodiment of the present invention, the hierarchical tree structure 134 is the available_segment_field list 130. As identified in element 314, relationships between segments 116 and fields 118, including matching and mutual exclusivity, are established and represented as the valid path 113 in the available_segment_field list 130. As shown in element 315, the full valid path 113 from the root segment 212 to the bottom segment 222 is represented. Elements 109, 110, 112, 113, 114, 116, 118, 126, 130, 134, and 144 are described with reference to FIG. 1, and elements 212 and 222 are described with reference to FIG. 2.

As shown in element 316, a test is performed to determine if there are additional fields 124 or data structures 114. Recall that additional fields 124 are associated with programming language data structures 114. As shown in element 318, if the result of the test of element 316 is YES, then the additional fields 124 and data structures 114 are defined into portions of the available_segment_field list 130. Then, as shown in element 320, the relationship between the additional fields 124 and data structures 114, including mutual exclusivity, is established and represented in the valid path 113 as the available_segment_field list 130. Then the program continues to the operation of element 322. Element 124 is described with reference to FIG. 1.

If the result of the test of element 316 is NO then the program continues to the operation of element 322. When element 322 is reached, either from element 320 or from element 316, the operation of the program continues as described with respect to FIG. 3B.

FIG. 3B is a flow diagram that illustrates receipt of valid input in the method of the present invention. Therefore as shown in element 330, the operation continues from the program operation described with respect to FIG. 3A. As shown in element 331 and when appropriate, the programming language data structure fields 118 in the path 113 are redefined. As shown in element 332, user input information 118 or batch input 119 is accepted. As shown in element 334, selected segments 121 and selected fields 123 are identified. As shown in element 336 mutually exclusive segments 116 and fields 118 are identified based on selected segments 121 and selected fields 123. Elements 118, 119, 121, and 123 are described with reference to FIG. 1.

As shown in element 342, a test is performed to determine if there are additional fields 124 or data structures 114. If the result of the test of element 342 is NO then the program proceeds to element 338. Alternatively, if the result of the test of element 342 is YES, then as shown in element 344 additional fields 124 and data structures 114 that are mutually exclusive with respect to selected segments 121 or selected fields 123 are identified. The data structures 114 that redefine the selected segments 121 and therefore are mutually exclusive are also identified. Element 124 is described with reference to FIG. 1.

Element 338 is then reached, either from element 342 or from element 344. As shown in element 338, mutual exclusivity of the following elements in the available_segment_field list 130 is presented: segments 116, fields 118, optional fields 124 and additional data structures 114. Then a test as shown in element 340 determines if more input has been generated. If the result of the test of element 340 is NO then the program exits as shown in element 346. Alternatively, if the result of the test of element 340 is YES then the program loops back to element 332.

Figure 4:
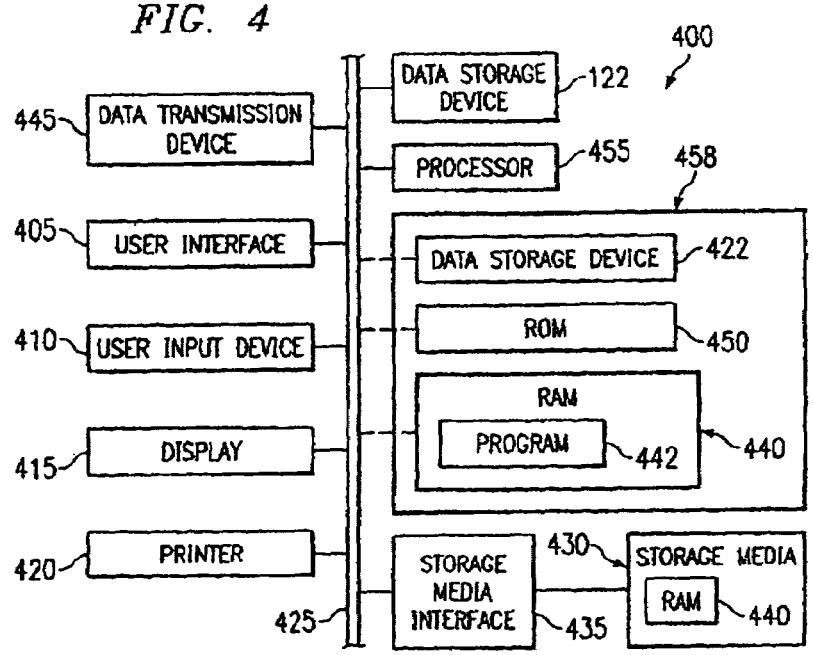
FIG. 4 is a block diagram of a computer system suitably configured for employment of the present invention.

FIG. 4 is a block diagram of a computer system 400, suitable for employment of the present invention. System 400 may be implemented on a general-purpose microcomputer, such as one of the members of the IBM Personal Computer family, or other conventional workstation or graphics computer device. In its preferred embodiment, system 400 includes a user interface 405, a user input device 410, a display 415, a printer 420, a processor 455, a read only memory (ROM) 450, a data storage device 122, such as a hard drive, a random access memory (RAM) 440, and a storage media interface 435, all of which are coupled to a bus 425 or other communication means for communicating information. Although the system 400 is represented herein as a standalone system, it is not limited to such, but instead can be part of a networked system. The computer system 400 may be connected locally or remotely to fixed or removable data storage devices 122 and data transmission devices 445. For example, the server computer system 104, the client computer system 102, and the host computer system 106 also could be connected to other computer systems 400 via the data transmission devices 445. Elements 102, 104, and 106 are described with reference to FIG. 1.

The RAM 440, the data storage device 122 and the ROM 450, are memory components 458 that store data and instructions for controlling the operation of processor 455, which may be configured as a single processor or as a plurality of processors. The processor 455 executes a program 442 to perform the methods of the present invention, as described herein.

While the program 442 is indicated as loaded into the RAM 440, it may be configured on a storage media 430 for subsequent loading into the data storage device 122, the ROM 450, or the RAM 440 via an appropriate storage media interface 435. Storage media 430 can be any conventional storage media such as a magnetic tape, an optical storage media, a compact disk, or a floppy disk. Alternatively, storage media 430 can be a random access memory 440, or other type of electronic storage, located on a remote storage system.

Generally, the computer programs and operating systems are all tangibly embodied in a computer usable device or medium, such as the memory 458, the data storage device 122, or the data transmission devices 445, thereby making an article of manufacture, such as a computer program product, according to the invention. As such, the terms "computer program product" as used herein are intended to encompass a computer program accessible from any computer usable device or medium.

Moreover, the computer programs 442 and operating systems are comprised of instructions which, when read and executed by the server computer system 104, the client computer system 102, and the host computer system 106, cause the server computer system 104, the client computer system 102, and the host computer system 106 to perform the steps necessary to implement and use the present invention. Under control of the operating system, the computer programs 442 may be loaded from the memory 458, the data storage device 122, or the data transmission devices 445 into the memories 458 of the server computer system 104, the client computer system 102, and the host computer system 106 for use during actual operations.

User interface 405 is an input device, such as a keyboard or speech recognition subsystem, for enabling a user to communicate information and command selections to the processor 455. The user can observe information generated by the system 400 via the display 415 or the printer 420. The user input device 410 is a device such as a mouse, track-ball, or joy stick that allows the user to manipulate a cursor on the display 415 for communicating additional information and command selections to the processor 455. Those skilled in the art will recognize many modifications may be made to this configuration without departing from the scope of the present invention.

When operating in accordance with one embodiment of the present invention, system 400 provides an easy to use graphical user interface (GUI) for displaying, navigating, and selecting hierarchically represented data segments 116 and fields 118. The processor 455 and the program 442 collectively operate as a module for presenting a hierarchical tree structure 134 that clearly represents the structures of a database 110 or a file 109, including mutual exclusivity of the data 144, for easy understanding of and navigation through the various data structures. It will be appreciated that the present invention offers many advantages over prior art techniques. Elements 109, 110, 116, 118, 134 and 144 are described with reference to FIG. 1.

The present invention is typically implemented using one or more computer programs, each of which executes under the control of an operating system and causes the server computer system 104, the client computer system 102, and the host computer system 106 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications may be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims

TRADEMARKS

IBM, DB2, IMS, and MVS are trademarks of International Business Machines Corporation in the United States, other countries, or both.

We claim:

1. A computer-implemented method for presenting a valid path in a hierarchical tree structure, wherein said computer includes at least one database description, said database description having at least one segment and at least one field, said method comprising:
   describing said database description in said hierarchical tree structure, thereby establishing a relationship between said at least one segment and said at least one database description field;
   placing said at least one segment into said hierarchical tree structure;
   placing said at least one database description field into said hierarchical tree structure;
   accepting a valid input to select said at least one segment, wherein said selected at least one segment includes a root segment and a bottom segment;
   accepting another valid input to select said at least one database description field;
   creating a valid path including said selected at least one segment and said selected at least one database description field, said valid path representing a full said valid path from said root segment to said bottom segment;
   representing mutual exclusivity of said selected at least one segment in said valid path; and
   presenting said valid path within said hierarchical tree structure.

2. The method of claim 1, wherein said selected at least one database description field includes a list of said database description fields, the method further comprising including said list of database description fields when presenting said valid path.

3. The method of claim 1 further comprising accepting additional valid input to select another said at least one segment thereby making said valid path an invalid path.

4. The method of claim 3, further comprising retaining said presentation of said invalid path while presenting another said valid path that includes another selected said at least one segment.

5. A computer-implemented method for presenting a valid path in a hierarchical tree structure, wherein said computer includes at least one programming language data structure, said programming language data structure having at least one segment and at least one field; said method comprising:
   describing said programming language data structure in said hierarchical tree structure, thereby establishing a relationship between said at least one segment and said at least one programming language data structure field;
   placing said at least one segment into said hierarchical tree structure;
   placing said at least one programming language data structure field into said hierarchical tree structure;
   accepting valid input to select said at least one segment, wherein said selected at least one segment includes a root segment and a bottom segment;
   accepting valid input to select said al least one programming language data structure field;
   creating a valid path that includes said selected at least one segment and said selected at least one programming language data structure field, said valid path representing a full said valid path from said root segment to said bottom segment;

representing mutual exclusivity of said selected at least one segment in said valid path; and presenting said valid path concisely within said hierarchical tree structure.

6. The method of claim 5, wherein said selected at least one programming language data structure field includes a list of said programming language data structure fields, the method further comprising including said list of programming language data structure fields when presenting said valid path.

7. The method of claim 5, further comprising:

redefining said at least one programming language data structure field; and presenting said at least one redefined programming language data structure field as mutually exclusive of said at least one programming language data structure field.

8. The method of claim 5 further comprising accepting additional valid input to select another said at least one segment thereby making said valid path an invalid path.

9. The method of claim 8, further comprising retaining said presentation of said invalid path while presenting another said valid path that includes said another selected at least one segment.

10. A computer-implemented method for presenting a valid path in a hierarchical tree structure, wherein said computer includes at least one database description and at least one programming language data structure, said database description having at least one segment, and said programming language data structure having at least one field; said method comprising:

describing said database description and said programming language data structure in said hierarchical tree structure, thereby establishing a relationship between said at least one segment and said at least one programming language data structure field;

placing said at least one segment into said hierarchical tree structure;

placing said at least one programming language data structure field into said hierarchical tree structure;

accepting valid input to select said at least one segment, wherein said selected at least one segment includes a root segment and a bottom segment;

accepting valid input to select said at least one programming language data structure field;

creating a valid path that includes said selected at least one segment and said selected at least one programming language data structure field, said valid path representing a full said valid path from said root segment to said bottom segment;

representing mutual exclusivity of said selected at least one segment in said valid path; and presenting said valid path concisely within said hierarchical tree structure.

11. The method of claim 10, wherein said selected at least one programming language data structure field includes a list of said programming language data structure fields, the method further comprising including said list of programming language data structure fields when presenting said valid path.

12. The method of claim 10, further comprising:

redefining said at least one programming language data structure field; and presenting said at least one redefined programming language data structure field as mutually exclusive of said at least one programming language data structure field.

13. A computer system for presenting a valid path in a hierarchical tree structure, wherein said computer system includes at least one database description, said database description having at least one segment and at least one field, said computer system comprising:

said database description that is described in said hierarchical tree structure, thereby establishing a relationship between said at least one segment and said at least one database description field;

said at least one segment that is included in said hierarchical tree structure;

said at least one database description field that is included in said hierarchical tree structure;

said at least one segment that is selected via valid input, wherein said selected at least one segment includes a root segment and a bottom segment;

said at least one database description field that is selected via valid input;

a valid path that is that includes said selected at least one segment and said selected at least one database description field, said valid path representing a full said valid path from said root segment to said bottom segment;

said valid path that represents mutual exclusivity of said selected at least one segment; and said valid path that is presented concisely within said hierarchical tree structure.

14. The computer system of claim 13, wherein said selected at least one database description field includes a list of said database description fields, the computer system further comprising said valid path that is presented with said list of database description fields.

15. The computer system of claim 13 further comprising another said at least one segment that is accepted via additional valid input thereby making said valid path an invalid path.

16. The computer system of claim 15, further comprising said presentation of said invalid path being retained while said valid path that includes said another selected at least one segment is presented.

17. A computer system for presenting a valid path in a hierarchical tree structure, wherein said computer system includes at least one programming language data structure, said programming language data structure having at least one segment and at least one field; said computer system comprising:

said programming language data structure that is described in said hierarchical tree structure, thereby establishing a relationship between said at least one segment and said at least one programming language data structure field;

said at least one segment that is included in said hierarchical tree structure;

said at least one programming language data structure field that is included in said hierarchical tree structure;, said at least one segment that is selected via valid input, wherein said selected at least one segment includes a root segment and a bottom segment;

at least one programming language data structure field that is selected via valid input;

a valid path that includes said selected at least one segment and said selected at least one programming language data structure field, said valid path representing a full said valid path from said root segment to said bottom segment;

said valid path that represents mutual exclusivity of said selected at least one segment; and said valid path that is presented concisely within said hierarchical tree structure.

18. The computer system of claim 17, wherein said selected at least one programming language data structure field includes a list of said programming language data structure fields, the computer system further comprising said valid path that is presented with said list of programming language data structure fields.

19. The computer system of claim 17, further comprising at least one redefined said programming language data structure field that is presented as mutually exclusive of said at least one programming language data structure field.

20. The computer system of claim 17 further comprising another said at least one segment that is accepted via additional valid input thereby making said valid path an invalid path.

21. The computer system of claim 20, further comprising said presentation of said invalid path being retained while said valid path that includes said another selected at least one segment is presented.

22. A computer system for presenting a valid path in a hierarchical tree structure, wherein said computer system includes at least one database description and at least one programming language data structure, said database description having at least one segment, and said programming language data structure having at least one field, said computer system comprising:

said database description and said programming language data structure that are described in said hierarchical tree structure, thereby establishing a relationship between said at least one segment and said at least one programming language data structure field;

said at least one segment that is included in said hierarchical tree structure;

said at least one programming language data structure field that is included in said hierarchical tree structure;

said at least one segment that is selected via valid input, wherein said selected at least one segment includes a root segment and a bottom segment;

said at least one programming language data structure field that is selected via valid input;

a valid path that includes said selected at least one segment and said selected at least one programming language data structure field, said valid path representing a full said valid path from said root segment to said bottom segment;

said valid path that represents mutual exclusivity of said selected at least one segment; and said valid path that is presented concisely within said hierarchical tree structure.

23. The computer system of claim 22, wherein said selected at least one programming language data structure field includes a list of said programming language data structure fields, the computer system further comprising said valid path that is presented with said list of programming language data structure fields.

24. The computer system of claim 22, further comprising at least one redefined said programming language data structure field that is presented as mutually exclusive of said at least one programming language data structure field.

25. An article of manufacture comprising a computer usable storage medium embodying one or more instructions executable by said computer for presenting a valid path in a hierarchical tree structure, wherein said computer includes at least one database description, said database description having at least one segment and at least one field, wherein:

said computer executable instructions describe said database description in said hierarchical tree structure, thereby establishing a relationship between said at least one segment and said at least one database description field;

said computer executable instructions place said at least one segment into said hierarchical tree structure;

said computer executable instructions place said at least one database description field into said hierarchical tree structure;

said computer executable instructions accept valid input to select said at least one segment, wherein said selected at least one segment includes a root segment and a bottom segment;

said computer executable instructions accept valid input to select said at least one database description field;

said computer executable instructions create a valid path that includes said selected at least one segment and said selected at least one database description field, said valid path representing a full said valid path from said root segment to said bottom segment;

said computer executable instructions represent mutual exclusivity of said selected at least one segment in said valid path; and said computer executable instructions present said valid path concisely within said hierarchical tree structure.

26. The article of manufacture of claim 25 wherein:

said computer executable instructions accept additional valid input to select another said at least one segment thereby making said valid path an invalid path; and said computer executable instructions retain said presentation of said invalid path while presenting another said valid path that includes said another selected at least one segment.

27. An article of manufacture comprising a computer usable storage medium embodying one or more instructions executable by said computer for presenting a valid path in a hierarchical tree structure, wherein said computer includes at least one programming language data structure, said programming language data structure having at least one segment and at least one field; wherein:

said computer executable instructions describe said programming language data structure in said hierarchical tree structure, thereby establishing a relationship between said at least one segment and said at least one programming language data structure field;

said computer executable instructions place said at least one segment into said hierarchical tree structure;

said computer executable instructions place said at least one programming language data structure field into said hierarchical tree structure;

said computer executable instructions accept valid input to select said at least one segment, wherein said selected at least one segment includes a root segment and a bottom segment;

said computer executable instructions accept valid input to select said at least one programming language data structure field;

said computer executable instructions create a valid path that includes said selected at least one segment and said selected at least one programming language data structure field, said valid path representing a full said valid path from said root segment to said bottom segment;

said computer executable instructions represent mutual exclusivity of said selected at least one segment; and said computer executable instructions present said valid path concisely within said hierarchical tree structure.

28. An article of manufacture comprising a computer usable storage medium embodying one or more instructions executable by said computer for presenting a valid path in a hierarchical tree structure, wherein said computer includes at least one database description and at least one programming language data structure, said database description having at least one segment, and said programming language data structure having at least one field; wherein:

said computer executable instructions describe said database description and said programming language data structure in said hierarchical tree structure, thereby establishing a relationship between said at least one segment and said at least one programming language data structure field;

said computer executable instructions place said at least one segment into said hierarchical tree structure;

said computer executable instructions place said at least one programming language data structure field into said hierarchical tree structure;

said computer executable instructions accept valid input to select said at least one segment, wherein said selected at least one segment includes a root segment and a bottom segment;

said computer executable instructions accept valid input to select said at least one programming language data structure field;

said computer executable instructions create a valid path that includes said selected at least one segment and said selected at least one programming language data structure field, said valid path representing a full said valid path from said root segment to said bottom segment;

said computer executable instructions represent mutual exclusivity of said selected at least one segment; and said computer executable instructions present said valid path concisely within said hierarchical tree structure.

* * * * *